US008634299B2

United States Patent
Lautenschlaeger

(10) Patent No.: US 8,634,299 B2
(45) Date of Patent: Jan. 21, 2014

(54) METHOD OF MANAGING A TRAFFIC LOAD

(75) Inventor: Wolfram Lautenschlaeger, Sachsenheim (DE)

(73) Assignee: Alcatel Lucent, Paris (FR)

( * ) Notice: Subject to any disclaimer, the term of this patent is extended or adjusted under 35 U.S.C. 154(b) by 33 days.

(21) Appl. No.: 13/376,496

(22) PCT Filed: Jun. 29, 2010

(86) PCT No.: PCT/EP2010/059163
§ 371 (c)(1),
(2), (4) Date: Dec. 6, 2011

(87) PCT Pub. No.: WO2011/000810
PCT Pub. Date: Jan. 6, 2011

(65) Prior Publication Data
US 2012/0092996 A1    Apr. 19, 2012

(30) Foreign Application Priority Data

Jun. 29, 2009    (EP) .................................... 09290501

(51) Int. Cl.
*H01R 31/08*    (2006.01)
(52) U.S. Cl.
USPC ............ 370/235; 370/229; 370/232; 370/238
(58) Field of Classification Search
USPC ......... 370/229, 232, 234, 235–240, 351, 356, 370/389, 392; 709/223–229
See application file for complete search history.

(56) References Cited

U.S. PATENT DOCUMENTS

| | | | |
|---|---|---|---|
| 7,577,736 B1* | 8/2009 | Ovenden | 709/224 |
| 2006/0146711 A1* | 7/2006 | Anbarani | 370/235 |
| 2008/0123531 A1* | 5/2008 | Gerkis | 370/235 |
| 2011/0119761 A1* | 5/2011 | Wang et al. | 370/401 |

OTHER PUBLICATIONS

Yu B et al.: "Towards fully automated adaptation of Red parameters to optimise TCP performance", XP006025967, Dated Jan. 2006.
Floyd S et al.: "Adaptive Red: An Algorithm for Increasing the Robustness of Red's Active Queue Management", XP009063579, Dated Aug. 2001.
Braden B et al.: "Recommendations on Queue Management and Congestion Avoidance in the Internet", XP015008093, Dated Apr. 1998.
Lautenschager W, Frohberg W: "Bandwidth Dimensioning in Packet-Based Aggregation Networks", XP002548882, Dated Oct. 2009.
International Search Report for International Application No. PCT/EP2010/059163 filed Jun. 29, 2010.

* cited by examiner

*Primary Examiner* — Anh-Vu Ly
*Assistant Examiner* — Gustavo Lopez-Vargas
(74) *Attorney, Agent, or Firm* — Harness, Dickey & Pierce

(57) ABSTRACT

In one embodiment, the network node receives a packet traffic aggregated from one or more concurrent application streams in a packet switched network. A number of the one or more concurrent application streams is estimated as a granularity of the packet traffic. A drop probability $P_d$ is calculated based on the estimated granularity and the current traffic load of the network node. The calculated drop probability $P_d$ is provided for a congestion control.

11 Claims, 2 Drawing Sheets

METHOD OF MANAGING A TRAFFIC LOAD

Figure 1A:
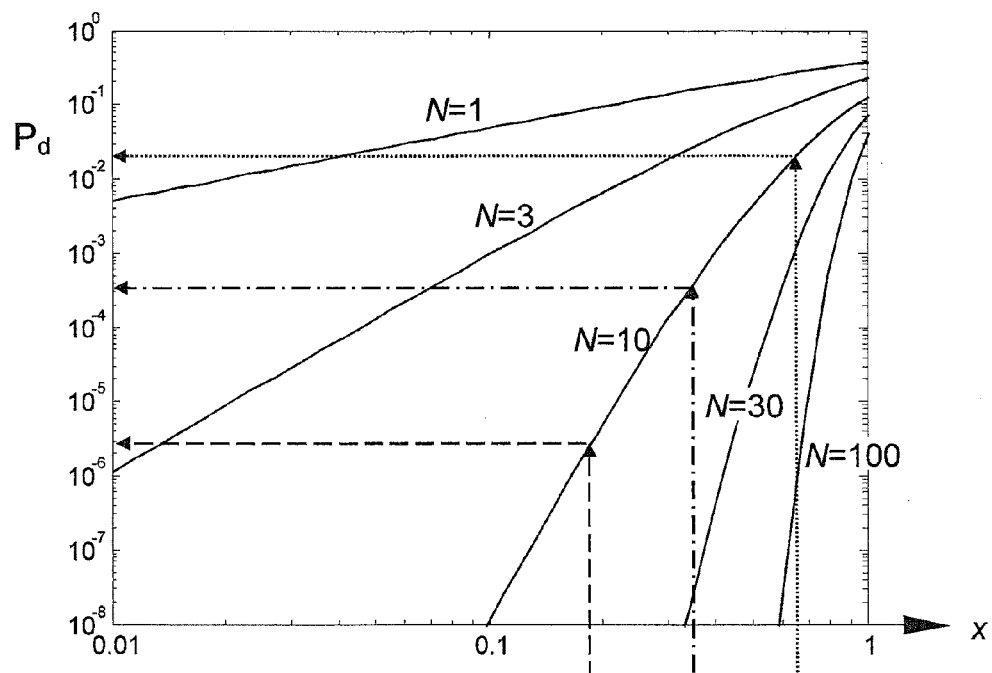

The present invention relates to a method of managing a traffic load of a network node receiving a packet traffic aggregated from a multitude of short lived application streams in a packet switched network, and a network node and a computer program product to execute said method.

RFC 2309 describes the Random Early Detection (=RED) algorithm which is a congestion notification algorithm commonly used in current routers handling a packet traffic. In particular, the RED algorithm is used for a management of a traffic load in a network node such as a router or a switch.

It is an object of the present invention to provide an improved management of a traffic load of a network node.

A first object of the present invention is achieved by a method of managing a traffic load of a network node receiving a packet traffic aggregated from a multitude of application streams in a packet switched network, comprising the steps of: a) estimating a granularity of the packet traffic as a maximum number of the application streams which fit into a transmission capacity B of the network node; b) calculating a drop probability $P_d$ based on the estimated granularity and the traffic load of the network node; and c) providing the calculated drop probability $P_d$ for a congestion control. A second object of the present invention is achieved by a network node receiving a packet traffic aggregated from a multitude of application streams in a packet switched network, the network node comprising a control unit adapted to estimate a granularity of the packet traffic as a maximum number of the application streams which fit into a transmission capacity B of the network node; calculate a drop probability $P_d$ based on the estimated granularity and the traffic load of the network node; and provide the calculated drop probability $P_d$ for a congestion control. A third object of the present invention is achieved by a computer program product for managing a traffic load of a network node receiving a packet traffic aggregated from a multitude of application streams in a packet switched network, whereby the computer program product, when executed by the network node, performs the steps of estimating a granularity of the packet traffic as a maximum number of the application streams which fit into a transmission capacity B of the network node; calculating a drop probability $P_d$ based on the estimated granularity and the traffic load of the network node; and providing the calculated drop probability $P_d$ for a congestion control.

The application streams are concurrent application streams, i.e. application streams whose life time overlaps with each other. The network node is an intermediate node in a transmission of a packet traffic between endpoints, e.g. between a source and a destination. The network node represents a transmission capability between the source and the destination. The network node receives the packet traffic for processing of the packets, e.g. for routing. As transmission means for the packet traffic, the network node possesses a certain transmission capacity B. If the network node is a router or a switch, the transmission capacity of the network node is limited by the rate at which the packets are routed or switched through the router or switch, respectively. If the network node is a transmission link, or more precisely the entry point thereof, the transmission capacity is simply the transmission speed of the link. If the volume of the packet traffic is zero, the load of the link represented by the network node, i.e. the link load, is also at zero, i.e. at its minimum. If the volume of the packet traffic is equal to the transmission capacity, the link load of the network node is at one, i.e. its maximum. If the volume of the packet traffic is greater than the transmission capacity, the link load is greater than one, i.e. the network node is overloaded.

The packet traffic is multiplexed from a multitude of short lived application streams. As the present invention is based on a statistical method, the present method works better for a statistically significant number of concurrent application streams. Although a multitude of application streams is involved over the considered time scales, it is to be noted that at a certain point of time only packets of one or a few application streams may be arriving at the network node. The term "short lived" means that a duration of an application stream is finitely long, preferably at least much shorter than a typical service time of a system, e.g. a network node, involved in the congestion control. A particular application stream represents a communication event of an end user application. It is characterised by a bit rate, a size and/or a duration. Application streams are initiated randomly and independently of each other by a large number of end users who are connected to said node, e.g. via a packet-based aggregation network. A mean number and a mean bit rate of concurrent application streams is referred to as a granularity of the packet traffic, i.e. a number of application streams that have been started but not yet finished at a given moment in time.

In order to be able to absorb temporary high packet loads, a network node preferably comprises a buffer, i.e. a queue where newly arriving incoming packets are buffered until it is their turn to be processed. If a buffer is full at a given moment in time, an incoming packet cannot be buffered and must be dropped, i.e. the packet is lost.

In connectionless packet transport networks like Ethernet/IP, a widely used congestion mitigation in those networks is the concept of elastic traffic (IP=Internet Protocol). Traffic sources are notified about the congestion condition together with a demand to reduce a current sending rate. In this description of the invention, the term "current" means a time period comprising the present time, preferably a time period starting at and including the present point in time and lasting a pre-defined, non-zero time interval, or a time period ending at and including the present point in time and lasting a pre-defined, non-zero time interval. Ideally this leads to an equilibrium close to a 100% resource utilisation and negligibly low losses, with all sources getting a fair share. In practice, the most popular elastic traffic implementation is the TCP protocol (TCP=Transmission Control Protocol). TCP keeps track of the packet arrival at the connection endpoints for the purpose of retransmission of lost packets. At the same time the recorded packet losses are interpreted as an implicit congestion notification. Correct TCP implementations reduce their sending rate accordingly. Embodiments of the invention can be used to manage elastic traffic (e.g. TOP) in a way where overflow is getting a rare exception. Embodiments of the to invention provide a configurable feature of routing or switching nodes which can be installed in existing TCP/IP networks. The benefit is a much smoother flow of TCP connections, highly reduced queuing jitter, and smaller buffers. Embodiments of the invention provide a congestion handling in packet transport equipment, e.g. routers or switches, which complies with the TCP protocol.

The above mentioned implicit congestion notification by packet drop in intermediate routers or switches can be implemented by particular drop strategies. A straightforward implementation is looking at the buffers as simple FIFOs with packet drop occurring whenever a packet arrives but the buffer is full (FIFO=First In-First Out). Depending on which packet is dropped, the strategies of Tail Drop, Head Drop or Random Drop can be distinguished. Unfortunately, these aforementioned simple overflow drop strategies have some severe disadvantages: There is the danger of the so-called global synchronisation, i.e. all affected connections synchronously reduce and re-establish their sending rate with the consequence of alternating periods of overload and underutilisation. Second, there is the possibility of an unfair resource allocation. The underlying root cause for this kind of misbehaviour is most likely the burst-like clustering of packet drops in case of buffer overflows that is in contrast to the assumption of randomly distributed packet losses in the commonly accepted TCP theory. A well-established and implemented mitigation to the problem above is the well-established Random Early Detection algorithm. Other than simple random drop in case of current buffer overflow, RED relies on the average queue size. The average queue size in a packet switch is used as an early indication of a threatening overload. If the average queue size goes beyond a certain threshold towards buffer full state, a random packet drop is initiated to early notify the TCP endpoints of the upcoming overload, ideally before the hard buffer overflow occurs. This process is to avoid the dangerous burstification of packet losses. Embodiments of the invention provide an extension to RED.

The RED algorithm calculates a mean queue size as a controlling metric. Recent research shows that this measure indicates the proportion of overflow conditions over time rather than the intended steady state queue size. Buffer filling is typically alternating between "nearly empty" and "almost full" with emphasis on "nearly empty" but with low probability to be somewhere in between (only transients between both corner points). From this point of view, the "average queue size" used in RED is rather an artificial measure indicating the proportion of overflow conditions over time. In other words, the assumption of a steady state queue size in RED is not valid. RED does work in practice but it does not really prevent from buffer overflow with all its unfavourable consequences (clustered packet losses, large queuing jitter, etc.). Furthermore, RED puts an additional burden on the dimensioning of buffers that is not required for the particular forwarding process but is only misused as a load measurement device. While RED is basically triggered by buffer overflows, the present invention means a replacement for RED that does not depend on buffer overflow.

Embodiments of the invention provide smoothly flowing TCP connections, better resource utilisation, less jitter. Embodiments of the invention enable reduced buffer space requirements and coexistence of services without cumbersome classification/prioritisation. Compared to RFC 2309, embodiments of the invention provide that congestion notification is better spread over time. Embodiments of the invention avoid the critical impact of clustered losses on TCP and higher (application) layers.

One straightforward idea to avoid the aforementioned cutbacks of RED is to link the congestion notification simply to the current traffic load. If in a particular network device the mean load is drawing to the capacity limit, then a random dropping could initiate a load reduction by the TCP transmitters at the end points. The crucial point why this straightforward approach does not work is that the tolerable load at a given capacity depends on the volatility of the traffic, which is by far not uniform over time and over all kinds of networks. Contrary to prior approaches, the present invention takes into account the volatility of the traffic.

The invention is set in a new packet transport network paradigm where Quality of Service for a wide variety of services can be reached without tedious classification and prioritisation schemes. The global idea wherein the present invention is set is to manage traffic statistically in a way where overload occurs only in extremely exceptional cases.

The proposed invention determines a drop probability according to a current traffic load and a traffic volatility. Other than in RED, the drop probability determined according to embodiments of the invention does not depend on buffer load conditions. The drop probability determined according to embodiments of the invention is dimensioned independent of the buffer space. Thus buffer overflow can be largely avoided, with the benefit of smoothly distributed losses (TCP friendly) and low queuing jitter. As a side effect, the buffer space can be kept small.

Theoretically, the granularity of the packet traffic could also be determined by looking into the packet protocol, e.g. source and destination addresses of the packets. However, this would require state full connection tracing in all intermediate network nodes which is a time-consuming procedure that binds a lot of resources and requires a huge amount of data comparison.

Further advantages are achieved by embodiments of the invention indicated by the dependent claims.

It is possible that the step b) comprises the following steps: assuming that a probability P(k) that a packet traffic with an average of A application streams consists of k application streams follows a Poisson distribution with $P(k)=A^k e^{-A}/k!$; calculating an overflow probability $P_{ov}$ as the sum of the probabilities P(k) for k>N whereby N is the estimated maximum number of the concurrent application streams whose traffic volume is smaller than a capacity B of the network node; and assuming the drop probability $P_d$ to be less than the overflow probability $P_{ov}$. N is the estimated maximum number of the application streams whose traffic volume is smaller than the capacity B of the network node.

According to the publication "Bandwidth Dimensioning in Packet-based Aggregation Networks", Lautenschlager, W. and Frohberg, W., Alcatel-Lucent Bell Labs, Murray Hill, N.J., USA, in: The 13th International Telecommunications Network Strategy and Planning Symposium 2008 (shortly: Networks 2008), Budapest 28 Sep. 2008-2 Oct. 2008, pp. 1-18, ISBN: 978-963-8111-68-5, retrievable from http://ieeexplore.ieee.org/, the volatility of traffic depends basically on the number of concurrent application streams that constitute the current traffic load. If a given load is created by a large number of narrow application streams then its fluctuation is low. It would require a large number of additional steams (which is unlikely to happen) to overload a particular transmission capacity. In the opposite case, i.e. with a small number of huge application streams, the expected fluctuations are high. Even a single additional application stream could overload a link, which could happen at any time. This effect can be explained mathematically as follows: In a system with randomly occurring concurrent application streams the probability distribution of the current number of streams follows a Poisson distribution:

$$P(k) = \frac{A^k e^{-A}}{k!} \qquad \text{eq. (1)}$$

with k the current number of streams and P(k) the probability to see that number k on a link with an average offered traffic of A concurrent application streams. The term "current" refers to a current time period which is substantially shorter than the mean duration of an application stream. Generally, the invention refers to current time periods and not current points in time because strictly speaking at an arbitrary point in time the transmission link, e.g. the network node, will be either occupied at 100% by a packet or idle/unoccupied. It is only when looking at a, preferably short, time period that a granularity of the packet traffic becomes apparent.

The term "link" refers to a packet transport facility, e.g. a data line or data link, associated with the network node handling the incoming packet traffic. The link has a limited transport capacity B, e.g. measured in bits (=bps). If the particular capacity B of a network element is able to handle up to N concurrent application streams, then the overflow probability $P_{ov}$ is the sum of the probabilities of eq. (1) for k>N:

$$P_{ov} = \sum_{k=N+1}^{\infty} P(k) \qquad \text{eq. (2)}$$

The real loss probability $P_d$ (=drop probability) is slightly less than the overflow probability $P_{ov}$ since in case of an overflow not all packets get lost but only the overshooting remainder. A more detailed derivation is given in the above mentioned publication of Lautenschlager and Frohberg. A corresponding equation for $P_d$ is given below in eq. (14).

Application streams are neither declared in packet transport networks nor of uniform size. So both the traffic load as well as the link capacity are of unknown granularity, which is, according to the aforementioned thoughts, the decisive parameter for the spreading of the load distribution. The prediction of loss probabilities by means of the eq. (1) and (2) above must make use of an estimate.

According to an embodiment of the invention, the step a) comprises the steps of: determining a capacity utilisation ratio x as a time-averaged ratio of the traffic load of the network node to the transmission capacity B, whereby 0≤x≤1 and the time averaging is on a first time scale; determining a time-averaged value $m_1$ of the capacity utilisation ratio x and a time-averaged value $m_2$ of the square $x^2$ of the capacity utilisation ratio x, whereby the time averaging is on a second time scale which is longer than the first time scale; and calculating $N=m_1/(m_2-(m_1)^2)$ as the said estimated maximum number of the application streams which fit into the transmission capacity B of the network node.

The granularity of a given aggregated packet flow is estimated by the following means. In a first averaging step, the packet traffic arriving at the network node is set into relation to the available capacity B of the network node, in particular of a data link of the network node on which link the packet traffic is transported. According to an embodiment of the invention, the first averaging step is done on a first time scale comparable to the buffer holding times of the associated network node. This first time scale may be on the order of the time needed for transmission of a packet, or a time distance between two successive packets. According to an embodiment of the invention, the first time scale is in a range from 500 µs to 100 ms, preferably in a range from 1 to 10 ms. The resulting "capacity utilisation ratio" x is a value from 0 to 1.

The capacity utilisation ratio x is also referred to as the relative traffic load. The traffic load r is measured as a data rate which is given as a ratio of data units per time unit, e.g. in the unit bit/s. The relative traffic load x is a dimensionless quantity in the range from 0 to 1 which relates the absolute traffic load r to the transport capacity B.

In a second averaging step, a first moment $m_1$ is derived from the capacity utilisation ratio x by averaging over time on a second time scale. A second moment $m_2$ is derived from the capacity utilisation ratio x by first squaring the capacity utilisation ratio x and then averaging the squared value over time on the second time scale. The term "moment" is a well-defined quantity in mathematical statistics. The averaging over time in order to create $m_1$ and $m_2$ is performed with identical parameters. This second time averaging step highly depends on the application, but contrary to the first time averaging step above, the second time scale is in, a range between minutes or even more. It is possible that the second time scale depends on the number of networks involved. According to an embodiment of the invention, the second time scale is in a range greater than one second. According to an embodiment of the invention, the second time scale is at least on hundred times greater than the first time scale.

Other averaging methods could be applied for the estimation of the first and second moments above, e.g. averaging over corresponding time intervals of the daily load curves within a month, etc.

From the moments $m_1$ and $m_2$, the estimated maximum number N of concurrent application streams is calculated, i.e. the capacity B (e.g. given in bit/s) is translated into an integer number of streams:

$$N = \frac{m_1}{m_2 - m_1^2} \qquad \text{eq. (3)}$$

The derivation of the equation (3) is explained in the following. The current traffic flow with a total data rate r is assumed to be an overlay of a multitude of application streams of (unknown) data rate $b_r$ each. It is further assumed that application streams arrive randomly and independently of each other from a large (approaching infinite) group of users. From the ITU/ITC Teletraffic Engineering Handbook, ITU-D Study Group 2, Question 16/2, Geneva, March 2004, http://www.com.dtu.dk/teletraffid, it is known that in this case the current number of concurrent streams is a random number k that follows a Poisson distribution:

$$P(k) = \frac{\lambda^k e^{-\lambda}}{k!} \qquad \text{eq. (4)}$$

where the intensity λ equals the mean number of concurrent streams (also known as "offered traffic", also known as "call attempts per mean holding time"). The intensity λ can be calculated as follows:

$$\lambda = \frac{E[r]}{b_r} = E\left[\frac{r}{b_r}\right] \qquad \text{eq. (5)}$$

with r the current traffic rate, E[r] the expectation value of r, and $b_r$ the unknown data rate of a single application stream. At the same time the available capacity B is able to carry at maximum N application streams of data rate $b_r$:

$$N = \frac{B}{b_r} \qquad \text{eq. (6)}$$

From equation (5) and equation (6), it can be derived that:

$$\lambda = \frac{E[r]}{B} \frac{B}{b_r} = E\left[\frac{r}{B}\right] \cdot N \qquad \text{eq. (7)}$$

where r/B is the capacity utilisation ratio x (of load to capacity).

The standard deviation of the Poisson distribution is known to be:

$$\sigma_2 = \lambda \quad \text{eq. (8)}$$

On the other hand, the observed number of concurrent application streams is $k^* = r/b_r$. Hence, the standard deviation as derived from the observation is:

$$\sigma^2 = E\left[\left(\left(\frac{x}{b_r}\right) - E\left[\frac{r}{b_r}\right]\right)^2\right] = \quad \text{eq. (9)}$$

$$\frac{E[r^2] - E^2[r]}{b_r^2} = \frac{E[r^2] - E^2[r]}{B^2} N^2 = \left(E\left[\left(\frac{r}{B}\right)^2\right] - E^2\left[\frac{r}{B}\right]\right) \cdot N^2$$

From the equations (7), (8) and (9), it can be derived that:

$$N = \frac{E\left[\frac{r}{B}\right]}{E\left[\left(\frac{r}{B}\right)^2\right] - E^2\left[\frac{r}{B}\right]} \quad \text{eq. (10)}$$

With the assumption of finite application streams, the expectation values can be replaced by mean values over time:

$$E\left[\frac{x}{B}\right] \cong m_1, \text{ and} \quad \text{eq. (11)}$$

$$E\left[\left(\frac{x}{B}\right)^2\right] \cong m_2 \quad \text{eq. (12)}$$

$$N = \frac{m_1}{m_2 - m_1^2} \quad \text{eq. (13)}$$

With the knowledge of the estimated maximum permitted number N of concurrent application streams within the bandwidth capacity B, the expected packet drop probability $P_d$ can be calculated as follows:

$$P_d = \sum_{k=\lfloor N \rfloor}^{\infty} \frac{A^k e^{-A}}{k!} \left(1 - \frac{N}{k+1}\right) \quad \text{eq. (14)}$$

with the offered traffic $$A = N \cdot m_1 \quad \text{eq. (15)}$$

It is obvious that the drop probability $P_d$ at a given load level $m_1$ depends not only on the load itself, but also on the granularity of the traffic, represented by the number N, i.e. the maximum permitted number of concurrent streams.

It can be expected that a network node of capacity B which is fed with the considered traffic would drop packets approximately at the estimated probability $P_d$. Unfortunately the real dropping is not well distributed over time, but clustered in short bursts, in particular at those times when the current load x exceeds the capacity limit. The clustering of the real drop rate makes it inappropriate for congestion notification, even though it is widely used in TCP.

According to another embodiment of the invention, instead of the real dropping, the estimated drop probability $P_d$ (see eq. (14)) can be used for congestion notification. It is rather constant at the time scale of the second averaging operation above.

The above solution still has the drawback of slow response to traffic adaptations by the TCP endpoints. To overcome this, another embodiment of the invention introduces a heuristic approach as follows: Instead of the mean load $m_1$, the current load $x_c$ or a combination of both $m_1$ and $x_c$ is used in eq. (15), i.e.

$$A = N \cdot x_c \quad \text{eq. (16)}$$

or $$A = N \sqrt{m_1 x_c}, \quad \text{eq. (17)}$$

The use of the current load $x_c$ instead of $m_1$ reintroduces the dynamic of the traffic changes into the congestion notification signal, but still avoids the clustering and also respects the impact of traffic granularity on the congestion.

The combination $m_1$ and $x_c$ is beneficial to saturate the impact of random exceptional large deviations of the current load $x_c$ from a long term mean $m_1$.

The heuristic function $P_d = f(N, m_1, x)$ as derived from eqs. (14)-(17) is based on the loss probability calculations in Lautenschlager and Frohberg (see above). The function $f(N, m, x)$ constitutes a comparably flat surface and thus can be implemented by an interpolation table. The function $f(N, m, x)$ takes into account not only the current load $x_o$ but also the mean load $m = m_1$ of the past to prevent from heavy dropping in case of exceptional unlikely deviations. Furthermore, the heuristics includes some threshold mechanisms and scaling factors like it is done also in the original RED algorithm.

The heuristics is based on the assumption that expected losses are anticipated by the random drop probability $P_d$. Other than the overflow losses which would be clustered in bursts, the random drop can be smoothly distributed as it has been explained in Floyd, S., and Jacobson, V., Random Early Detection Gateways for Congestion Avoidance, IEEE/ACM Transactions on Networking, V.1 N.4, August 1993, pp. 397-413. Thus, this leads to a TCP- and application-friendly packet loss profile.

The calculated drop probability $P_d$ is provided for a congestion control. Depending on the provided drop probability $P_d$, a congestion notification may be initiated. According to another embodiment of the invention, the method further comprises the steps of: dropping and/or marking a packet of the packet traffic which is being received in accordance with the calculated drop probability $P_d$. The dropping of a packet at the network node can have an effect of decreasing the traffic load of the network node. It is possible that a congestion notification is initiated after dropping and/or marking of the packet. The drop probability $P_d$ specifies the percentage of packets which is not simply routed by the network node according to a destination address of the packets but handled by the network node in a special way. It is possible that the special treatment of a packet means that the packet is dropped by the network node, e.g. the packet is deleted. Embodiments of the invention can be used as an improvement of RED, a dropped packet having an effect of an implicit congestion notification. It is also possible that the special treatment of a packet by the network node means that the packet is marked (setting of a flag or a bit, e.g. congestion marking), counted, routed to a special destination address, etc. The dropping and/or marking of the packet may initiate a known congestion avoidance process to determine when to send or delay the transmission of data packets. It is possible that endpoints of the application streams are notified by means of the congestion notification wherein these endpoints are requested to decrease the amount of packets sent by the sources.

Another embodiment of the invention uses the expected drop probability $P_d$ for congestion pricing or accounting. In this case, in a interconnection gateway between two different network domains, the sending network is accounted for the degree of congestion that it injects into the receiving network.

According to another embodiment of the invention, the congestion notification is used as a trigger to reduce a rate of the packet traffic. Depending on the calculated drop probability $P_d$, traffic sources are notified about the congestion condition together with the demand to reduce the current sending rate. Ideally this leads to an equilibrium close to 100% resource utilisation and negligibly low losses, with all sources getting a fair share. In practice the most popular elastic traffic implementation is the TCP protocol. TCP keeps track of the packet arrival at the connection endpoints for the purpose of retransmission of lost packets. At the same time the recorded packet losses are interpreted as implicit congestion notification. Correct TCP implementations reduce their sending rate accordingly. Embodiments of the invention co-operate with TCP implementations.

Figure 1B:
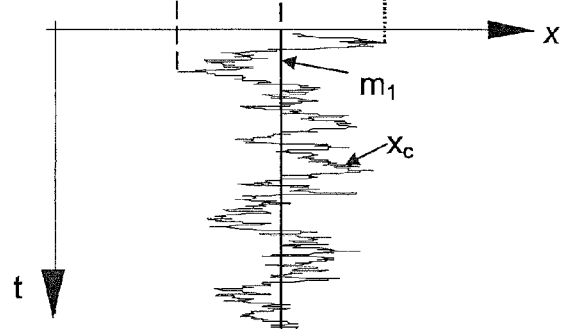

These as well as further features and advantages of the invention will be better appreciated by reading the following detailed description of exemplary embodiments taken in conjunction with accompanying drawings of which:

FIGS. 1a and 1b are an illustration of the heuristics underlying the present invention. FIG. 1a shows the drop probability $P_d$, derived by means of the function f (N, m), in general as a function of the relative traffic load x and with N as a parameter; FIG. 1b illustrates how the relative traffic load x is applied to the function of FIG. 1a: either by its long term mean $m_1$ or by its current (=short term) value $x_c$.

Figure 2:
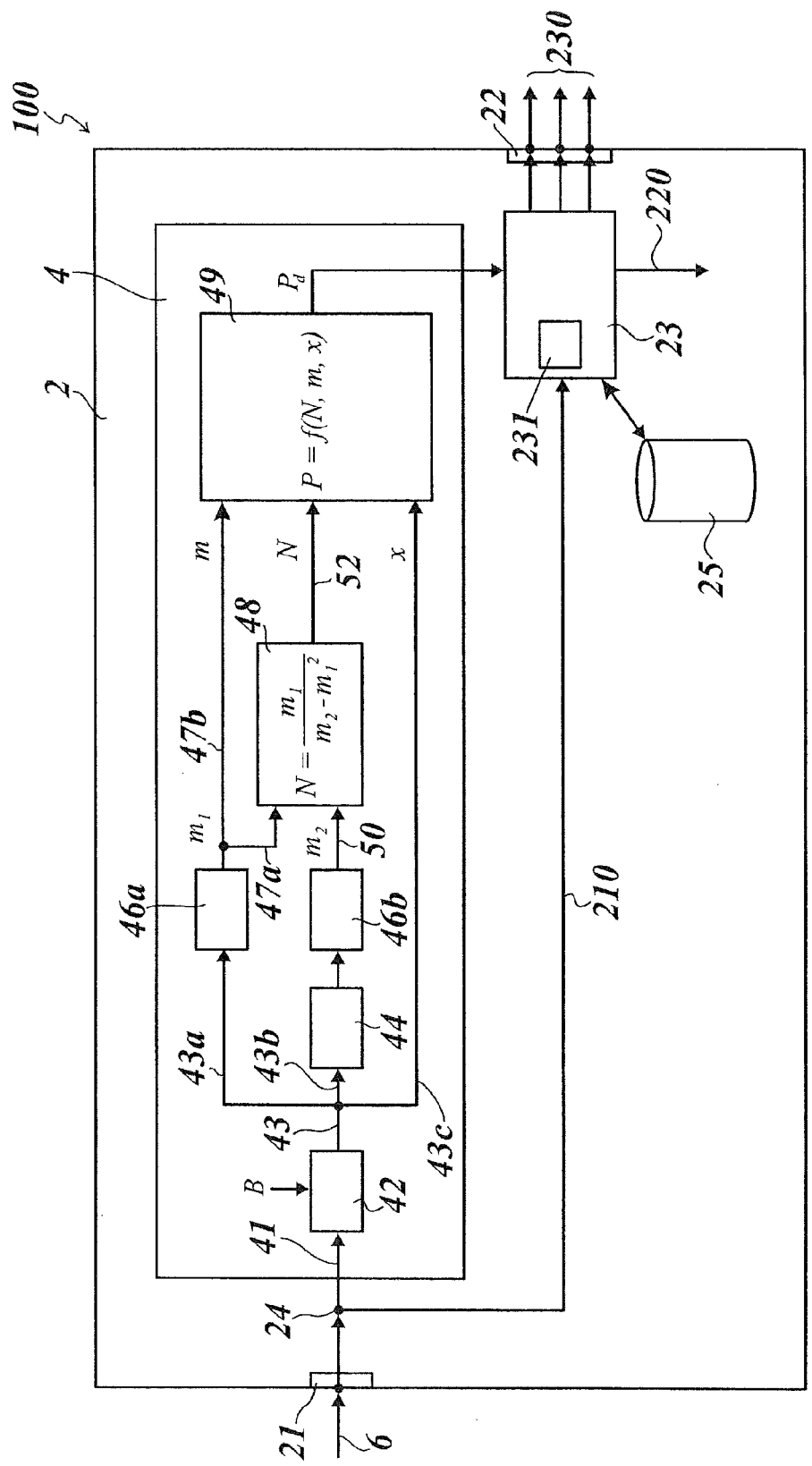

FIG. 2 is a block diagram of a network node according to an embodiment of the invention.

FIGS. 1a and 1b are an example how a drop probability $P_d$ can be derived from a measurement of the relative traffic load x on a network node. FIG. 1a gives a curve sketching with a drop probability $P_d$ as a function of the capacity utilisation ratio x with 0≤x≤1. The sketching gives five numerically determined curves of $P_d$ for five different estimated maximum numbers N of concurrent application streams, namely for N=1, 3, 10, 30 and 100. The function $P_d$=f (N, m) as given in FIG. 1a has been numerically obtained for these selected values of N by means of eq. (14).

FIG. 1b gives a curve sketching with the capacity utilisation ratio x as a function of time t. First, the sketching shows the highly fluctuating value of the current capacity utilisation ratio $x_c$. The current capacity utilisation ratio $x_c$ is the time-averaged ratio of the traffic load r of the network node to the capacity B of the network node whereby the time averaging is on a first time scale, e.g. on milliseconds. Second, the sketching shows a constant value $m_1$ which is a time-averaged value of the capacity utilisation ratio x whereby the averaging is on a time scale of several minutes.

Depending on which capacity utilisation ratio x is used for the calculation of the drop probability $P_d$, significantly different values of the drop probability $P_d$ are obtained. Also, the resulting drop probability $P_d$ significantly depends on the estimated maximum number N of concurrent application streams.

The drop probability $P_d$ for N=10 is exemplarily determined in FIG. 1a for three different values of the relative traffic load x: the mean value x=m1≈0.35 gives (follow the dot-dashed arrows) a drop probability $P_d$≈2.5·10$^{-4}$, the minimum value of relative traffic load $x_{c,min}$≈0.18 gives (follow the dashed arrows) a drop probability $P_d$=2·10$^{-6}$, and the maximum value of relative traffic load $x_{c,max}$≈0.65 gives (follow the dotted arrows) a drop probability $P_d$≈1.5·10$^{-2}$. The FIGS. 1a and 1b illustrate how much the calculated drop probability $P_d$ depends on the estimated granularity N of the packet traffic and on the relative traffic load x. It becomes obvious that the drop probability $P_d$ at a given relative load level x, here $m_1$ or $x_c$, depends not only on the load x itself, but also on the granularity N of the traffic, i.e. the maximum permitted number of concurrent streams.

FIG. 2 is a block diagram illustrating a network node according to an embodiment of the invention. FIG. 2 shows a network node 2, e.g. a router or a switch, with an incoming link 6 and a plurality of outgoing links 230 in a packet switching network 100, e.g. the Internet. A packet switched network is also referred to as a connectionless packet transport network. On the input link 6, packet traffic aggregated from a plurality of sources arrives at the router 2, on a data link via an input interface 21. The router 2 comprises a control unit 4, a routing unit 23, and a routing table 25. An incoming packet is transmitted from the input interface 21 via a connection 210 to the routing unit 23. First, the packet is put into a buffer 231 of the routing unit 23. If it is the turn of the packet and if the packet is not selected to be dropped (see below), the routing unit 23 extracts routing-related information from the incoming packet, e.g. a destination address from a packet header of the packet, looks up corresponding routing data in the routing table 25, and forwards the packet according to the routing data on one or more of the plurality of output links 230.

The control unit 4 comprises a first module 42, a squaring device 44, a first and a second averaging device 46a and 46b, a granularity calculator 48, and a probability calculator 49. The control unit 4 is composed of one or several inter-linked computers, i.e., a hardware platform, a software platform basing on the hardware platform and several application programs executed by the system platform formed by the software and hardware platform. The functionality of the control unit 4 are provided by the execution of these application programs. The application programs or a selected part of these application programs constitute a computer software product providing a probability computing service as described in the following, when executed on the system platform. Further, such computer software product is constituted by a storage medium storing these application programs or said selected part of application programs.

The control unit 4 provides a drop probability $P_d$ to the routing unit 23. Depending on the drop probability $P_d$, the routing unit 23 drops 220 or marks or notifies about the congestion state in any other way a corresponding percentage of the incoming packets, i.e. deletes 220 the packets. As an example, if the drop probability is 0.05, the routing unit 23 drops five percent of the incoming packets on a statistical approach. The routing unit 23 can decide on its own which packets are to be dropped. Preferably, the choice of a packet to be dropped is achieved by means of a random generator.

At a first distribution node 24 of the router 2, the signal of the incoming packet traffic is distributed to two connections. The packet traffic is forwarded to the routing unit 23. Also, the packet traffic is sent 41 to the first module 42. Another input to the first module 42 is the current capacity B of the router 2, e.g. the processing capacity of the routing unit 23. The first module 42 is an averaging device which sets the volume of the arriving packet traffic (e.g. measured in bit/s) into relation to the available capacity B (e.g. measured in bit/s) and averages this ratio. The averaging is done on a time scale comparable to the holding time of the buffer 231 of the router 2. For example, this may be in the range from 1 to 100 ms. The time-averaged ratio of the volume of the arriving packet traffic and of the available capacity B is called the capacity utilisation ratio x, which is a value in a range from 0 to 1 at a millisecond resolution.

At a second distribution node 43, the capacity utilisation ratio x is distributed to three connections. The capacity utilisation ratio x is sent via a connection 43a to the first averaging device 46a. Also, the capacity utilisation ratio x is sent via a connection 43b to the squaring device 44. And, the capacity utilisation ratio x is sent via a connection 43c to the probability calculator 49.

The first averaging device 46a averages the capacity utilisation ratio x over time. The averaging is done on a time scale in a range of seconds to minutes or more. For example, this time scale may be 1 second, 10 seconds, 3 minutes of 10 minutes. The time-averaged value of the capacity utilisation ratio x is called $m_1$. The quantity $m_1$ is forwarded on a connection 47a to the granularity calculator 48 and on a connection 47b to the probability calculator 49.

The squaring device 44 squares the capacity utilisation ratio x and forwards the squared capacity utilisation ratio $x^2$ to the second averaging device 46b.

The second averaging device 46b averages the squared capacity utilisation ratio $x^2$ over time. The averaging is done on a time scale identical to the averaging of the first averaging device 46a. Preferably, the first averaging device 46a and the second averaging device 46b are identical time-averaging devices, only with different inputs to be averaged. The time-averaged value of the squared capacity utilisation ratio $x^2$ is called $m_2$. The quantity $m_2$ is forwarded on a connection 50 to the granularity calculator 48.

The granularity calculator 48 calculates from the received quantities $m_1$ and $m_2$ the quantity $N=m_1/(m_2-(m_1)^2)$ as the estimated maximum number of the concurrent application streams which are lower than the capacity B of the router 2. The granularity calculator 48 forwards the calculated quantity N on a connection 52 to the probability calculator 49.

The probability calculator 49 calculates from the received quantity $m_1$ (also simply referred to as m), the received quantity N, and the received capacity utilisation ratio x a probability P=f(N, m, x). The probability calculator 49 sends the calculated probability P to the routing unit 23 which uses the probability P for congestion notification, in particular, which fraction of packets to mark or drop.

The routing unit 23 either drops a packet, which would be an implicit congestion notification to the receiver of a TCP connection, or it sends an explicit congestion notification to one of the communication endpoints by e.g. marking a packet accordingly or by an explicit message. Thus, the calculated drop probability $P_d$ which is provided from the control unit 4 to the routing unit 23 controls a congestion notification, i.e. the congestion notification is dependent on the calculated drop probability $P_d$. If the calculated drop probability $P_d$ is zero, no congestion notification is initiated. If the calculated drop probability $P_d$ is one, a congestion notification is definitely initiated. If the calculated drop probability $P_d$ is between zero and one, a congestion notification is initiated dependent on the value of the calculated drop probability $P_d$.

The invention claimed is:

1. A method of managing a traffic load of a network node for receiving a packet traffic aggregated from a multitude of application streams in a packet switched network, comprising:
   a) estimating a granularity of the packet traffic as a maximum number of the application streams which fit into a transmission capacity B of the network node;
   b) calculating a drop probability $P_d$ based on the estimated granularity and the traffic load of the network node; and
   c) providing the calculated drop probability $P_d$ for a congestion control, wherein the step a) comprises,
   determining a capacity utilisation ratio x as a time-averaged ratio of the traffic load of the network node to the transmission capacity B, whereby $0 \leq x \leq 1$ and the time averaging is on a first time scale;
   determining a time-averaged value $m_1$ of the capacity utilisation ratio x and a time-averaged value $m_2$ of the square $x^2$ of the capacity utilisation ratio x, whereby the time averaging is on a second time scale which is longer than the first time scale; and
   calculating $N=m_1/(m_2-(m_1)^2)$ as the said estimated maximum number of the application streams which fit into the transmission capacity B of the network node, wherein
   $m_1$, $m_2$, N and x are real numbers.

2. The method of claim 1, wherein the first time scale is comparable to a buffer holding time of the network node.

3. The method of claim 1, wherein the first time scale is in a range from 1 to 10 ms.

4. The method of claim 1, wherein the second time scale is greater than 1 s.

5. The method of claim 1, wherein the second time scale is at least 100 times greater than the first time scale.

6. The method of claim 1, wherein the step b) comprises:
   assuming that a probability P(k) that a packet traffic with an average of A application streams consists of k application streams follows a Poisson distribution with $P(k)=A^k e^{-A}/k!$;
   calculating an overflow probability $P_{ov}$ as the sum of the probabilities P(k) for k>N whereby N is the maximum number of the application streams which fit into the transmission capacity B of the network node; and
   assuming the drop probability $P_d$ to be less than the overflow probability $P_{ov}$, wherein
   e, A and k are real numbers.

7. The method of claim 1, wherein the method further comprises:
   dropping and/or marking a packet of the packet traffic which is being received in accordance with the calculated drop probability $P_d$.

8. The method of claim 1, wherein the method further comprises:
   initiating a congestion notification in accordance with the calculated drop probability $P_d$.

9. The method of claim 8, wherein the method further comprises:
   triggered by the congestion notification, reducing a rate of the packet traffic.

10. A network node for receiving a packet traffic aggregated from a multitude of application streams in a packet switched network, the network node comprising:
   a control unit configured to estimate a granularity of the packet traffic as a maximum number of the application streams which fit into a transmission capacity B of the network node;
   calculate a drop probability $P_d$ based on the estimated granularity and the traffic load of the network node; and provide the calculated drop probability $P_d$ for a congestion control, wherein the control unit, for the said estimation of a granularity of the packet traffic, is further configured to,
   determine a capacity utilisation ratio x as a time-averaged ratio of the traffic load of the network node to the transmission capacity B, whereby $0 \leq x \leq 1$ and the time averaging is on a first time scale;
   determine a time-averaged value $m_1$ of the capacity utilisation ratio x and a time-averaged value $m_2$ of the square $x^2$ of the capacity utilisation ratio x, whereby the time averaging is on a second time scale which is longer than the first time scale; and calculate $N=m_1/(m_2-(m-m_1)^2)$ as the said estimated maximum number of the application streams which fit into the transmission capacity B of the network node, wherein $m_1$, $m_2$, N and x are real numbers.

11. A computer program product comprising:

a non-transitory computer readable medium having computer executable code for managing a traffic load of a network node for receiving a packet traffic aggregated from a multitude of application streams in a packet switched network, the computer executable code when executed causing a processor of the network node to perform:

a) estimating a granularity of the packet traffic as a maximum number of the application streams which fit into a transmission capacity B of the network node;

b) calculating a drop probability $P_d$ based on the estimated granularity and the traffic load of the network node; and c) providing the calculated drop probability $P_d$ for a congestion control, wherein the step a) comprises, determining a capacity utilisation ratio x as a time-averaged ratio of the traffic load of the network node to the transmission capacity B, whereby $0 \le x \le 1$ and the time averaging is on a first time scale;

determining a time-averaged value $m_1$ of the capacity utilisation ratio x and a time-averaged value $m_2$ of the square $x^2$ of the capacity utilisation ratio x, whereby the time averaging is on a second time scale which is longer than the first time scale; and calculating $$N = \frac{m_1}{(m_2 - (m - m_1)^2)}$$

as the said estimated maximum number of the application streams which fit into the transmission capacity B of the network node, wherein $m_1$, $m_2$, N and x are real numbers.

* * * * *